United States Patent [19]

Kasukawa et al.

[11] Patent Number: 5,328,579

[45] Date of Patent: Jul. 12, 1994

[54] METHOD FOR FORMING A PAINT FILM

[75] Inventors: Takahisa Kasukawa; Teiji Katayama; Ichiro Tabuchi; Mitsuharu Morino; Hiroshi Inoue; Toshio Ohkoshi, all of Kanagawa, Japan

[73] Assignee: Kansai Paint Co., Ltd., Kanagawa, Japan

[21] Appl. No.: 970,021

[22] Filed: Jan. 25, 1993

Related U.S. Application Data

[62] Division of Ser. No. 742,420, Aug. 8, 1991, Pat. No. 5,229,210.

[51] Int. Cl.$^5$ ............................................. C25D 13/12
[52] U.S. Cl. .................................. 204/181.1; 204/181.7
[58] Field of Search ........................... 204/181.1, 181.7

[56] References Cited

U.S. PATENT DOCUMENTS

| | | | |
|---|---|---|---|
| 4,046,729 | 9/1977 | Scriven et al. | 204/181.7 |
| 4,104,147 | 8/1978 | Marchetti et al. | 204/181.7 |
| 4,375,498 | 3/1983 | Le Minez et al. | 204/181.1 |
| 4,419,467 | 12/1983 | Wisner et al. | 204/181.7 |
| 4,450,200 | 5/1984 | Iwato et al. | 525/443 |
| 4,614,683 | 9/1986 | Barsotti | 524/44 |
| 4,619,746 | 10/1986 | Delaney et al. | 204/181.1 |
| 4,761,212 | 8/1988 | Watanabe et al. | 204/181.1 |
| 4,818,356 | 4/1989 | Geist et al. | 204/181.1 |
| 4,888,244 | 12/1989 | Masubuchi et al. | 204/181.1 |
| 4,937,274 | 6/1990 | Arima et al. | 106/403 |
| 4,976,833 | 11/1990 | Debroy et al. | 204/181.7 |
| 5,055,168 | 10/1991 | Lawrenz et al. | 204/181.7 |

FOREIGN PATENT DOCUMENTS

| | | |
|---|---|---|
| 54-145743 | 11/1979 | Japan . |
| 59-62372 | 4/1984 | Japan . |
| 62-96573 | 5/1987 | Japan . |
| 2109385 | 6/1983 | United Kingdom . |

Primary Examiner—John Niebling
Assistant Examiner—Kishor Mayekar
Attorney, Agent, or Firm—Wenderoth, Lind & Ponack

[57] ABSTRACT

A method for forming a multilayer paint film comprising the steps of forming an uncured film on a substrate with a cationically depositable paint on a substrate, further coating an aqueous paint on the uncured film of the electrodeposited film in a wet-on-wet manner, and then curing with heating the both films, wherein (i) the electrodeposited film of the cationically electrodepositable paint has a film weight reduction after curing with heating of 10% by weight or less; and wherein (ii) the aqueous paint is composed mainly of (a) a polyester resin optionally modified with a urethane and having an acid value within the range of 10 to 100 and a hydroxyl value within the range of 20 to 300; and (b) a water-soluble or -dispersible amino resin.

19 Claims, No Drawings

METHOD FOR FORMING A PAINT FILM

This is a divisional application of Ser. No. 07/742,420, filed Aug. 8, 1991, now U.S. Pat. No. 5,229,210.

The present invention relates to a process for forming a multilayer paint film, and more particularly to a novel method for forming a multilayer paint film by a so-called two-coat-one-bake process in which a cationically electrodeposited paint and an aqueous paint are coated in a wet-on-wet process, and then the resulting two paint films are cured simultaneously.

BACKGROUND OF THE INVENTION

It has heretofore been widely practiced to coat a cationically electrodepositable paint by electrodeposition and curing with heating, followed by further coating an intercoat paint or a topcoat paint and then curing with heating.

However, in view of reduction in the number of steps of painting, economization of resources and prevention of environmental pollution, there has been a keen desire to develop a method for forming a paint film by a two-coat-one-bake process in which a surface coated with a cationically electrodepositable paint is further coated with an aqueous intercoat or topcoat paint without curing with heating the previously coated surface of the electrodepositable paint, and then the both paint films are heated to cure them simultaneously. However, up to present none has been put into practical use.

For example, when after it is coated with an organic solvent type paint, a coated surface of an uncured, cationically electrodeposited paint is heated so that the both painted films can be cured, the uncured cationically electrodeposited paint-coated surface is swollen or corroded with an organic solvent contained in the organic solvent-type paint, resulting in that depressions and protrusions, wrinkles or shrinks tend to occur in the coated surface after the curing with heating.

Alternatively, when an aqueous paint composed mainly of a polyester resin and a fully etherated melamine resin is used instead of the aforementioned organic solvent type paint, defects such as depressions and protrusions, wrinkles or shrinks do not almost occur but a problem arises that basic substances or low molecular weight substances which vaporise from the uncured cationically electrodeposited film upon heating migrate in large amounts into the upper coated film to prevent its curing reaction, with the result that the upper film is not cured sufficiently. In addition, there is also a disadvantage that the aqueous paint film itself does not have an enough smoothness or distinctness of image gloss.

A primary object of the present invention is to solve the aforementioned drawbacks involved in the method for forming a multilayer paint film by painting a cationically electrodepositable paint and an aqueous paint by a two-coat-one-bake process.

Other objects and advantages of the present invention will be apparent from the following description.

SUMMARY OF THE INVENTION

According to the present invention, there is provided a method for forming a multilayer paint film comprising the steps of forming an uncured film on a substrate with a cationically depositable paint on a substrate, further coating an aqueous paint on the uncured film of the electrodeposited film in a wet-on-wet process, and then curing with heating the both films, wherein (i) the electrodeposited film of the cationically electrodepositable paint has a film weight reduction after curing with heating of 10% by weight or less; and wherein (ii) the aqueous paint is composed mainly of (a) a polyester resin optionally modified with a urethane and having an acid value within the range of 10 to 100 and a hydroxyl value within the range of 20 to 300; and (b) a water-soluble or -dispersible amino resin.

Since the method of the present invention is a method for forming a multilayer paint film based on a so-called two-coat-one-bake process in which an aqueous paint is coated on a film of uncured film of a cationically electrodepositable paint in a wet-on-wet process, and then the both paint films are cured simultaneously, the step of curing with heating which would otherwise be necessary after the coating of the electrodepositable paint but before the coating of the aqueous paint can be avoided. This is advantageous not only in that costs incurred in the formation of multilayer point films can be reduced but also in that the method of the present invention is safe and hygienic due to unnecessity of use of organic solvents, causing no environmental pollution and being useful for saving resources.

Furthermore, the multilayer paint film formed by the method of the present invention has a smoothness, luster and distinctness of image gloss, adhesion of film, resistance to humidity, anti-chipping properties and curability which are superior to those of films obtained by the aforementioned conventional methods, and has also technical effects that it gives rise to no sagging, wrinkle, shrink or depression and protrusion.

DETAILED DESCRIPTION

Hereafter, the method of the present invention will be explained in more detail.

Cationically Electrodepositable Paint

The cationically electrodepositable paint which can be used in the present invention is one which gives a paint film having a film weight reduction after curing with heating of 10% by weight or less. If a cationically electrodepositable paint having a film weight reduction after curing with heating of above 10% by weight is used, generally the smoothness and distinctness of image gloss of a film of an aqueous paint coated on the film of the cationically electrodepositable paint tend to be decreased.

The "film weight reduction" (X) due to the curing with heating of the cationically electrodepositable paint as used herein is a value obtained by carrying out cationic electrodeposition of a substrate under ordinary conditions in an electrodeposition bath, drawing the substrate from the bath, washing the coated surface of the substrate, heating the substrate at 105° C. for 3 hours to remove substantially all the moisture in the substrate, measuring the weight (Y) of the paint film, heating the paint film at 170° C. for 20 minutes to three-dimensionally crosslink the paint film, measuring the weight (Z) of the paint film, and calculating from the measured values Y and Z according to the following equation:

$$X(\%) = \left[\frac{Y-Z}{Y}\right] \times 100$$

The cationically electrodepositable paint used in the method of the invention is not limited particularly and any cationically electrodepositable paint may be used so far as it has a film weight reduction after curing with heating of 10% by weight or less, preferably 7% by weight or less, more preferably 5% by weight or less. However, as the cationically electrodepositable paint which is used in the present invention advantageously, there can be cited the following ones.

(1) A cationically electrodepositable paint comprising (A) resin having hydroxyl groups and cationic groups; and (B) an epoxy resin having at least 2 epoxy functional groups each of which comprises an epoxy group directly bound to an alicyclic ring and/or bridged alicyclic ring on average per molecule as principal components.

An electrodeposited paint film formed with this cationically electrodepositable paint is cured at a temperature of less than about 250° C. Especially, when compounds containing metals such as lead, zirconium, cobalt, aluminum, manganese, copper, zinc, iron, chromium and nickel are blended singly or in combination as a catalyst, the electrodeposited paint film can be cured with heating at such a low temperature as from about 70° C. to about 160° C. It is inferred that these curings are attributable to ring-opening of an epoxy group contained in the epoxy resin (B) and reaction with a (preferably primary) hydroxyl group in the resin (A), and to reaction of one epoxy group with another in the epoxy resin (B) to form ether bonds, respectively that crosslink and cure the resin composition.

Accordingly, the cationically electrodepositable paint has various excellent advantages such as it can be cured at a low temperature of not more than 160° C. in the absence of a tin catalyst; further it is free from a blocked isocyanate compound or a derivative thereof and can dissolve the aforesaid various drawbacks produced by their use; it is free from the volumetric shrinkage due to thermal decomposition and exhibits good adhesion; it is free from an aromatic urethane linkage or aromatic urea linkage and does not hurt the weather resistance; it is excellent in corrosion resistance, curability and bath stability.

The resin (A) having hydroxyl groups and cationic groups used in said cationically electrodepositable paint [which may be hereinafter referred to as "the base resin (A)"] is optionally resin containing hydroxyl groups reactive with the epoxy group of the component (B) and a sufficient number of cationic groups for forming a stable aqueous dispersion. As said base resin (A), for example, what follows may be cited.

(i) A reaction product obtained by reacting a polyepoxy resin with a cationizing agent;

(ii) A polycondensation product of a polycarboxylic acid and polyamine (see U.S. Pat. No. 2,450,940) protonated with an acid;

(iii) A polyaddition product of polyisocyanate and polyol and mono- or poly-amine protonated with an acid;

(iv) A copolymer of an acryl or vinyl monomer containing a hydroxyl group and one containing amino group protonated with an acid (see Japanese Patent Publications Nos. 12395/1970 and 12396/1970);

(v) An adduct of a polycarboxylic acid resin and an alkylene imine protonated with an acid (see U.S. Pat. No. 3,403,088); etc.

Since the specific examples of these cationic resins and the processes for their production are described in, for example, Japanese Patent Publications Nos. 12395/1970 and 12396/1970, and GB 1327071 as well as U.S. Pat. Nos. 2,450,940, 3,403,088, 3,891,529 and 3,963,663, detailed description of the specific examples of these cationic resins and the processes for their production is replaced by quotation of these references in this specification.

What is especially desirable as the base resin (A) in the present invention is a reaction product obtained by reacting a polyepoxide compound having an excellent anticorrosive property and obtained from a polyphenol compound and epichlorohydrin with a cationizing agent included in (i), above.

Said polyepoxide compound is a compound having at least 2 epoxy groups

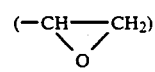

in one molecule, and having a number average molecular weight within the range of generally at least 200, preferably 400 to 4,000, more preferably 800 to 2,000 is suitable. As such polyepoxide compound, what is known per se may be used, for example, polyglycidyl ether of a polyphenol compound which may be produced by reacting a polyphenol compound with epichlorohydrin in the presence of an alkali, is included.

As the polyphenol compound which may be used in the above reaction, there may be cited, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylether, 4,4'-dihydroxydiphenylsulfone, phenol novolak and cresol novolak.

Of the aforesaid polyepoxide compounds, what is especially preferable for the production of the base resin (A), is polyglycidylether of a polyphenol compound having a number average molecular weight of at least about 380, more preferably about 800 to about 2,000 and an epoxy equivalent of 190 to 2,000, preferably 400 to 1,000, especially what is represented by the following formula:

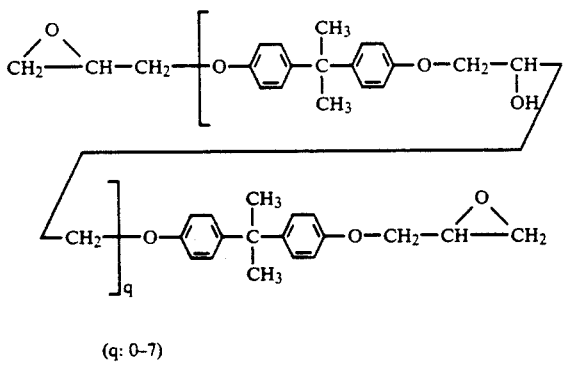

(q: 0-7)

Said polyepoxide compound may be partly reacted with polyol, polyether polyol, polyester polyol, polyamide amine, a polycarboxylic acid and polyisocyanate, and further, it may be graft polymerized with ε-caprolactone or an acrylic monomer, etc.

On the other hand, as a cationizing agent for introducing a cationic group to said polyepoxide compound, there may be cited an aliphatic, alicyclic or aromatic-aliphatic primary or secondary amine, tertiary amine salt, secondary sulfide salt and tertiary phosphine salt. These react with an epoxy group to produce a cationic group. It is further possible to introduce a cationic group by reacting a tertiary amino monoisocyanate obtained from a tertiary aminoalcohol and a diisocyanate, with a hydroxyl group of the epoxy resin.

As examples of the amine compound in said cationizing agent, for example, the following amines may be exemplified.

(1) Primary amines such as methyl amine, ethyl amine, n- or iso-propyl amine, monoethanol amine and n- or iso-propanol amine;

(2) Secondary amines such as diethyl amine, diethanol amine, di-n- or iso-propanol amine, N-methylethanol amine and N-ethylethanolamine; and (3) Polyamines such as ethylene diamine, diethylene triamine, hydroxyethylaminoethyl amine, ethylaminoethyl amine, methylaminopropyl amine, dimethylaminoethyl amine and dimethylaminopropyl amine.

Of these amines, alkanol amines having hydroxyl groups are preferable. Also, a primary amino group of polyamines may be reacted with ketone in advance to block said group, and then the remaining active hydrogen may be reacted with an epoxy group.

Further, besides said amine compounds, a basic compound such as ammonia, hydroxyl amine, hydrazine hydroxyethyl hydrazine and a N-hydroxyethyl imidazoline compound may be used similarly. Basic groups formed by using these compounds may be protonated with an acid, especially preferably a water-soluble organic carboxylic acid such as formic acid, acetic acid, glycolic acid and lactic acid to be made into cationic groups.

Furthermore, tertiary amines such as triethyl amine, triethanol amine, N,N-dimethylethanol amine, N-methyldiethanol amine, N,N-diethylethanol amine and N-ethyldiethanol amine may be used, they may be protonated with an acid in advance, and then reacted with an epoxy group to be made into quaternary salts.

Besides the salts of tertiary amines, salts of sulfides such as diethyl sulfide, diphenyl sulfide, tetramethylene sulfide or thiodiethanol and boric acid, carbonic acid or an organic monocarboxylic acid may be reacted with an epoxy group to make them tertiary sulfonium salts.

In addition, salts of phosphines such as triethyl phosphine, phenyldimethyl phosphine, diphenylmethyl phosphine or triphenyl phosphine and such acids as mentioned above may be reacted with an epoxy group to make them quaternary phosphonium salts.

As hydroxyl groups of the base resin (A), there may be cited, for example, primary hydroxyl groups of alkanol amines as said cationizing agent, of ring opened caprolactone and of general polyols; and secondary hydroxyl groups of epoxide resin. Of these, primary hydroxyl groups by alkanol amines are preferable because of excellent in crosslinking reactivity with the epoxy resin (B). As such alkanol amines, what is exemplified in said cationizing agent is preferable.

The content of hydroxyl groups in the base resin (A) is, from the point of view of the crosslinking reactivity with the epoxy group contained in the epoxy resin (B), preferably, calculated as a hydroxyl group equivalent, within the range of 20 to 5,000, especially 100 to 1,000. Especially, the primary hydroxyl group equivalent is preferably within the range of 200 to 1,000. The content of cationic groups is preferably in excess of the lower limit necessary for stably dispersing said base resin (A), and generally it is preferably within the range of 3 to 200, especially from 10 to 80 calculated as amine value KOH mg/g the solids. However, even if the cationic group content is less than 3, it is possible to use it after making it an aqueous dispersion by the use of a surface active agent; in this case, however, it is desirable to adjust the cationic group so as to make the pH of the aqueous dispersed composition, usually 4 to 9, more preferably 6 to 7.

The base resin (A) has hydroxyl groups and cationic groups and is desirably free from free epoxy groups as a rule.

Next, an explanation will be made with reference to the epoxy resin (B) used in admixture with said base resin (A) as a curing agent.

Said epoxy resin (B) [which may be referred to hereinafter as "the curing resin (B)"] is a curing agent for forming a crosslinked paint film mainly by an etherification reaction with the base resin (A) as mentioned above, which contains at least 2, preferably at least 3, specified "epoxy functional groups" on average in one molecule.

Namely, said epoxy functional group in the curing resin (B) comprises an epoxy group directly bonded to an alicyclic ring and/or bridged alicyclic ring in which said alicyclic ring is a 4-10 member, preferably 5-6 member saturated carbon monocyclic or polycyclic ring, while said bridged alicyclic ring contains bridges (endmethylene, endethylene, etc.) of a straight chain (linear) or branched $C_{1-6}$ (preferably $C_{1-4}$) alkylene group (for example, $-CH_2-$, $-CH_2CH_2-$, $-CH(CH_3)-$, $-CH_2(CH_3)CH_2-$, $-C(CH_3)_2-$, $-CH(C_2H_5)CH_2-$, etc.) between 2 carbon atoms constituting said monocyclic or polycyclic ring.

On the other hand, an epoxy group

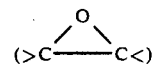

is important in that one of the carbon atoms in said epoxy group is directly bonded to the cyclic carbon atom (or atoms) of said alicyclic ring or said bridged alicyclic ring [see, for example, the following formulae (I) and (II)], or the two carbon atoms of said epoxy group are common with the two adjoining carbon atoms constituting the ring in said alicyclic ring or said bridged alicyclic ring [see, for example, the following formulae (III) and (IV)].

As the specific examples of such epoxy functional group, what is represented by the following formulae (I) to (IV) may be cited.

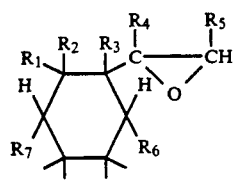
(I)

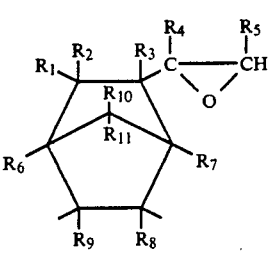
(II)

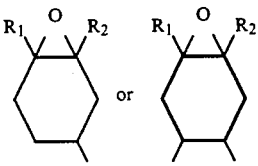
(III)

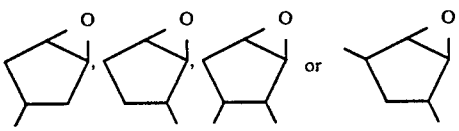
(IV)

wherein
$R_1$, $R_2$, $R_3$, $R_5$, $R_6$, $R_7$, $R_{10}$ and $R_{11}$ represent H, $CH_3$ or $C_2H_5$, respectively, while $R_4$, $R_8$ and $R_9$ represent H or $CH_3$, respectively.

The epoxy resin (B) used in the present invention may have at least 2, preferably at least 3, more preferably at least 4, epoxy functional groups selected from said formulae (I) to (IV) on average in one molecule. For example, the epoxy resin (B) may have at least one kind of the epoxy functional group represented by said formula (I) or (II), or may have at least one kind of the epoxy functional group represented by said formula (III) or (IV) in one molecule. Furthermore, the epoxy resin (B) may have at least one kind of the epoxy functional group represented by said formula (I) or (II) and at least one kind of the epoxy functional group represented by said formula (III) or (IV) within one and same molecule or in different molecules.

Of the epoxy functional group represented by said formula (I) or (III) is preferable, and especially, an epoxy functional group represented by the following formula (V)

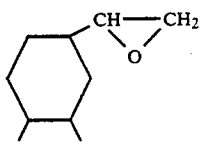
(V)

an an epoxy functional group represented by the following formula (VI) are preferable.

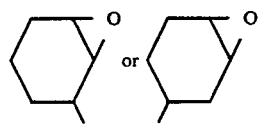
(VI)

Additionally, the epoxy equivalent and the molecular weight of the epoxy resin (B) are not strictly restricted, but are changeable according to a process for the production thereof and the use of the end resin composition. But, generally speaking, the epoxy equivalent may be within the range of usually 100 to 2,000, preferably 150 to 500, more preferably 150 to 250.

And it is proper that the number average molecular weight is within the range of usually 400 to 100,000, preferably 700 to 50,000, more preferably 700 to 30,000.

The epoxy resin [the curing resin (B)] having at least 2 such epoxy functional groups in one molecule is described in literatures such as, for example, Japanese Patent Publication No. 8016/1981 as well as Japanese Laid-Open Patent Publications Nos. 47365/1982, 166675/1985, 221121/1968 and 234028/1988, and what is known per se may be used.

Or said epoxy resin (B) having said epoxy functional groups is obtained by processes known per se. The main processes for producing said epoxy resin (B) will be enumerated hereinbelow, but the enumerated processes are not limitative.

A first process for the production:
A process for producing an epoxy resin having at least 2 epoxy functional groups in one molecule which comprises epoxidating part of carbon-carbon double bonds of an alicyclic compound having said at least 2 carbon-carbon double bonds in one molecule, subjecting the resulting epoxy groups to a ring-opening polymerization, and thereafter epoxidating said double bonds remaining in the resulting polymer.

A second process for the production:
A process for subjecting an alicyclic compound having at least 2 epoxy groups in the same molecule to a ring-opening polymerization to such an extent as may not eliminate all of said epoxy groups on the basis of said epoxy groups.

A third process for the production:
A process for polymerizing a compound having an epoxy functional group and a polymerizable unsaturated bond in the same molecule.

A more specific explanation will be made with reference to these processes for the production hereinbelow.

The first process for the production:
This process comprises epoxidating part of carbon-carbon double bonds (a partial epoxidation product) contained in an alicyclic compound having at least 2 carbon-carbon double bonds in one molecule [hereinafter referred to as "the alicyclic compound (C)"], obtaining a ring-opened polymer of said partial epoxidation product by ring-opening polymerization of the resulting epoxy groups, and thereafter epoxidating part or whole of said double bonds remaining in said polymer to thereby obtain a curing resin (B).

The alicyclic compound (C) is a compound having a structure of an alicyclic ring or a bridged alicyclic ring mentioned above and at least 2 carbon-carbon double bonds, existing between 2 adjoining carbon atoms constituting the ring structure or between the other carbon atoms being directly bonded to said ring structure.

The alicyclic compound (C) may also be obtained by heating, for example, a conjugated diene compound by a known method. As such conjugated diene compound, an aliphatic or alicyclic compound having 4 to 30 carbon atoms and having at least 1 pair, preferably 1 to 5 pairs of conjugated double bonds in one molecule is suitable.

Specific examples of such conjugated diene compound include butadiene, isoprene, pirylene, 1,3-hexadiene, 2, 4-hexadiene, 2,4-heptadiene, 2-methyl-6-methylene-2,7 -octadiene, 2,6-dimethyl-1,5,7-octatriene, cyclopentadiene, cyclohexadiene, 4-ethyl-2-methylcyclopentadiene, 3-isopropyl-1-methylcyclopentadiene, 5-isopropylcyclopentadiene, 1,2,3,4-tetraphenylcyclopentadiene, 1,2,4-triphenylcyclopentadiene, 1,4-diphenylcyclopentadiene, 1,3-octachloropentadiene, hexachlorocyclopentadiene, 5,5-diethoxy-1,2,3,4-tetrachlorocyclopentadiene, 1,2,3,4,5-pentachlorocyclopentadiene, 1,2,3,4-tetrachlorocyclopentadiene, 1,3-cycloheptadiene, 1,3-cyclooctadiene, 1,3,5-cyclooctatriene, 1,3,6-cyclooctatriene, cyclooctatetraene, chlorocyclooctatetraene, bromocyclooctatetraene and 5-cyclohexylidenecyclopentadiene. These conjugated diene compounds may be used singly or in combination, respectively.

As required, when a conjugated diene compound under heating is reacted in the presence of a Ziegler catalyst, the alicyclic compound (C) is obtained. This reaction under heating may be carried out by a method known per se, for example, by a method disclosed in Japanese Laid-Open Patent Publication No. 102643/1974.

When typical examples of the so obtained alicyclic compound (C) are shown, they are as follows.

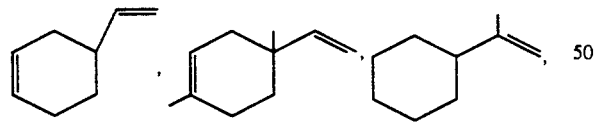

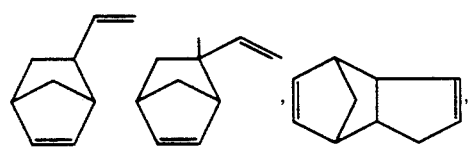

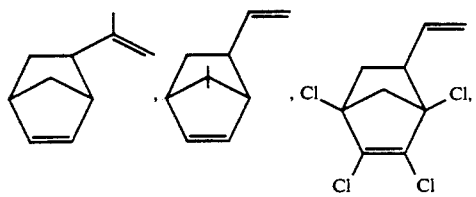

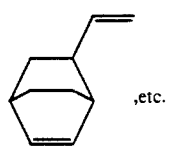, etc.

Of the aforesaid conjugated diene compounds, alicyclic compounds such as cyclopentadiene, cyclohexadiene and 4-ethyl-2-methylcyclopentadiene; and such compounds as sylvestrene, 2,8(9)-p-menthadiene, pyronene, 1,3-dimethyl-1-ethyl-3,5-cyclohexadiene, terpinene, phellandrene, dipentene, iso-limonene and limonene have already structures of the alicyclic compound (C), therefore, these compounds may be used per se without being subjected to said reaction under heating.

At first, part of (at least 2) carbon-carbon double bonds contained in the alicyclic compound (C) is modified to epoxy groups with a peroxide and so forth (partial epoxidation). The partial epoxidation product is obtained by modifying part of a plurality of double bonds contained in said alicyclic compound (C) to epoxy groups. When specific examples of such partial epoxidation product are shown, they are as follows.

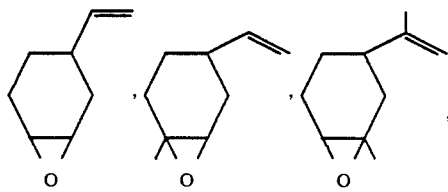

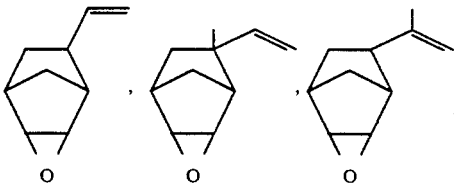

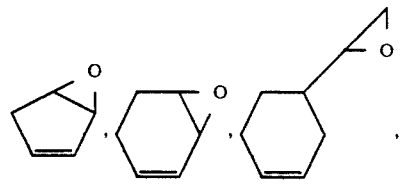

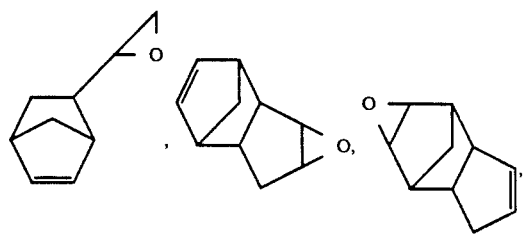

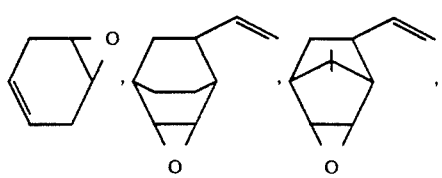

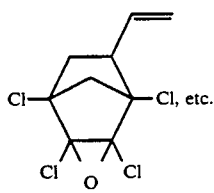

Naturally available epoxy carene may also be used as a partial epoxidation product.

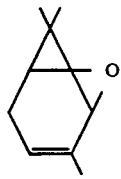

A partial epoxidation product has at least 1 epoxy group and at least 1 carbon-carbon double bond in one molecule, and said double bond is required to exist between 2 adjoining carbon atoms constituting the ring or between the other carbon atoms directly bonded to said ring.

Next, based on epoxy groups in this partial epoxidation product, a ring-opening polymerization is carried out to obtain a polymer of the alicyclic compound (C). It is preferable to use a polymerization initiator for this ring-opening polymerization, and the terminal of the end product of the curing resin (B), a residue X by the initiator component(s) may be bonded, where X is a residue of an organic compound having active hydrogen. As an organic compound having active hydrogen which is a precursor of X, there may be cited, for example, alcohols, phenols, carboxylic acids, amines and thiols. Of these, as the alcohols, either one or monohydric alcohols or di- or higher polyhydric alcohols will do. Specific examples of the alcohols include aliphatic monohydric alcohols such as methanol, ethanol, propanol, butanol, pentanol, hexanol and octanol; an aromatic monohydric alcohol such as benzyl alcohol; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, hydroxypivalic acid neopentyl glycol ester, cyclohexane dimethanol, glycerin, diglycerin polyglycerin, trimethylol propane, trimethylol ethane, pentaerythritol and dipentaerythritol.

Specific examples of the phenols include phenol, cresol, catechol, pyrogallol, hydroquinone, hydroquinone monomethylether, bisphenol A, bisphenol F, 4,4'-dihydroxybenzophenone, bisphenol S, phenol resin and cresol novolak resin.

As the carboxylic acids, there may be illustrated formic acid, acetic acid, propionic acid, butyric acid, fatty acid of animal and vegetable oils; fumaric acid, maleic acid, adipic acid, dodecanoic diacid, trimellitic acid, pyromellitic acid, polyacrylic acid, phthalic acid, isophthalic acid and terephthalic acid, and further, a compound having both hydroxyl group and a carboxylic acid such as lactic acid, citric acid and hydroxycaproic acid may be used as well.

Besides, as the other compound having active hydrogen, a mixture of water and alkoxysilane such as tetramethyl silicate, tetraethyl silicate, methyltrimethoxysilane, methyltriethoxysilane, dimethyl dimethoxysilane and phenyl trimethoxysilane or silanol compounds of these; polyvinyl alcohol, a polyvinyl acetate partial hydrolyzed product, starch, cellulose, cellulose acetate, cellulose acetate butyrate, hydroxyethyl cellulose, acrylpolyol resin, styrene-allyl alcohol copolymer resin, styrene-maleic acid copolymer resin, alkyd resin, polyesterpolyol resin and polycaprolactonepolyol resin may be also used. Such compound may have an unsaturated double bond together with active hydrogen, further, said unsaturated double bond may be epoxidated. And a catalyst and a polymerization initiator may be the same like an alkoxy metal compound. Usually, the aforesaid organic compound having active hydrogen is used as a polymerization initiator, while the aforesaid partial epoxidation product such as, for example, 4-vinylcyclohexene-1-oxide, 4-vinylcyclo[2,2,1]-3-methyl-4(or 5)-t-propenyl-1-cyclohexene oxide, 2,4- or 1,4-dimethyl- 4-ethenyl-1-cyclohexene oxide, 4-vinylcyclo[2,2,1]heptene-1-oxide (vinylnorbornene oxide) and 2-methyl-4-isopropanyl-cyclohexene oxide are used singly or in combination upon carrying out a ring-opening polymerization. At this time, it is also possible to carry out a ring-opening polymerization in the co-presence of the other epoxy compound but belonging to said partial epoxidation product. As the other copolymerizable epoxy compound, any compound will do so long as it has an epoxy group, but suitable examples of such other copolymerizable epoxy compound include an oxide of an unsaturated compound such as ethylene oxide, propylene oxide, butylene oxide and styrene oxide; a glycidyl ether compound such as allylglycidyl ether, 2-ethylhexylglycidyl ether, methylglycidyl ether, butylglycidyl ether and phenylglycidyl ether; unsaturated organic carboxylic acid glycidyl ester compound such as acrylic acid and methacrylic acid; and an alicyclic oxiran group-containing vinyl monomer such as 3,4-epoxycyclohexyl methyl (meth)acrylate.

The aforesaid ring-opened polymer is obtained by ring-opening polymerizing epoxy groups contained in a partial epoxidation product alone or as required in the other epoxy compound made to be co-present with said partial epoxidation product to form an ether bond. The proportion of the other epoxy compound in a ring-opened polymer may be optionally selected in accordance with the object, but specifically, it is desirable to select said epoxy compound within such a range of proportion that said compound may have at least 2, preferably at least 3, more preferably at least 4, of one or more kinds of said structural formulae (I) to (IV) on average per molecule of the resulting ring-opened polymer. It is preferable that the number average molecular weight of the so obtained (co)polymer is within the range of usually from 400 to 100,000, especially from 700 to 50,000, more especially 700 to 30,000.

It is generally preferable to carry out a ring-opening polymerization reaction in the presence of a catalyst.

Specific examples of the catalyst that can be used include amines such as methyl amine, ethyl amine, propyl amine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH: Lewis acid or its complexes such as $BF_3$, $ZnCl_2$, $AlCl_3$ and $SnCl_4$; and organometallic compounds such as triethyl aluminum, aluminum acetyl acetonate, titanium acetyl acetonate and diethyl zinc.

These catalysts may be used in amounts within the range of generally 0.001 to 10% by weight, preferably 0.1 to 5% by weight based on the reactant. The ring-opening polymerization temperature is within the range of generally about −70° to about 200° C., preferably about −30° to about 100° C. The reaction may be carried out in the presence of a solvent, and it is preferable to use an ordinary organic solvent not having active hydrogen as a solvent.

In the ring-opened polymer, there are double bonds derived from the alicyclic compound (C), and the epoxy resin (B) is obtained by epoxidating part or whole of said double bonds. Epoxidation of the double bonds may be carried out by using an epoxidation agent such as, for example, peroxy acids and hydroperoxides. Whether a solvent should be used or not and the reaction temperature in the epoxidation reaction may be properly adjusted according to the apparatus used and the physical properties of the starting material. Depending on the conditions of the epoxidation reaction, simultaneously with epoxidation of the double bonds in the ring-opened polymer as a starting material, a side reaction occurs and the modified substituent may be contained in the skeleton of the epoxy resin sometimes. As such modified substituent, when, for example, peracetic acid is used as the epoxidation agent, a substituent of the following structure may be cited, which is considered to be attributable to reaction of the produced epoxy group with the by-produced acetic acid.

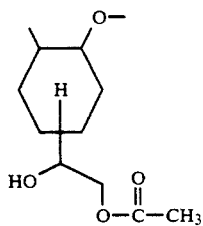

The ratio at which these substituents are contained in said skeleton is determined according to the kind of the epoxidation agent, the molar ratio of the epoxidation agent to the unsaturated bond and the reaction conditions.

The epoxy equivalent of the so obtained epoxy resin (B) is preferably within the range of generally 100 to 2,000, especially 150 to 500, more especially 150 to 250.

As such epoxy resin (B), what is commercially available may also be used, and as such merchandise, for example, EHPE-3150, EHPE-3100 and EHPE-1150 (trade names of products of Daicel Chemical Industries, Ltd.) may be cited. These are epoxy resins of the following structural formula having cyclohexene skeletons using 4-vinylcyclohexene-1-oxide as a partial epoxidation product for their production.

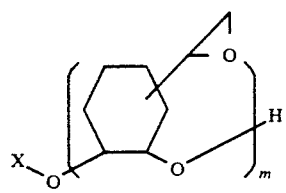

wherein n is at least 2, preferably at least 3, more preferably at least 4.

The second process for the production:

According to this process, the objective epoxy resin is obtained by, for example, epoxidating at least 2 double bonds of the double bonds contained in said alicyclic compound (C), and thereafter subjecting said compound (C) to a ring-opening polymerization in such a manner as to retain the resulting epoxy groups.

As said epoxidation product having at least 2 epoxy groups on average per molecule, the following monocyclic or condensed ring-type compounds may be shown as typical examples.

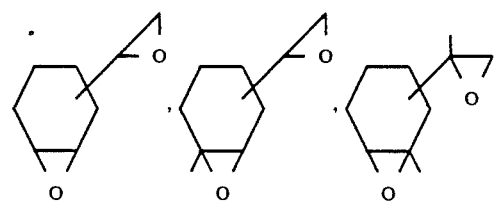

(For example, a product under a trade name of "Celoxide" of Daicel Chemical Industries, Ltd. may be cited),

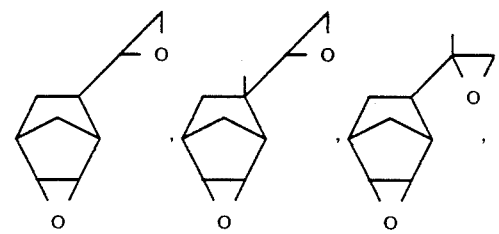

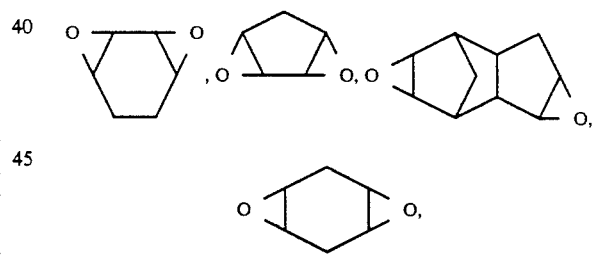

Specifically, at least one kind of said epoxy compound is subjected to a ring-opening polymerization, as required in the presence of a polymerization initiator and a catalyst in the same way as in the first process for the production mentioned above and the reaction is suspended at the predetermined reaction stage in which epoxy groups are remaining to thereby obtain the epoxy resin (B). For suspending the reaction, optional means such as dilution with a solvent and cooling may be used.

In this process for the production, said other epoxy compound may be copolymerized as in said first process for the production as well.

The so obtained curing resin (B) may be an epoxy resin having at least one kind of the epoxy functional group shown by said formula (I) or (II) and at least one kind of the epoxy functional group shown by said formula (III) or (IV) in the same molecule or different molecules.

The so obtained ring-opened polymer [the curing resin (B)] preferably has a number average molecular weight within the range of generally 400 to 100,000, especially 700 to 50,000 and conveniently has an epoxy equivalent within the range of generally 100 to 2,000, especially 150 to 500, more especially 150 to 250.

The third process for the production:

As a compound having at least one epoxy functional group and a polymerizable unsaturated bond in the same molecule (which may be hereinafter referred to as "a polymerizable epoxy monomer"), there may be cited, for example, what is represented by the following general formulae ① to ⑫.

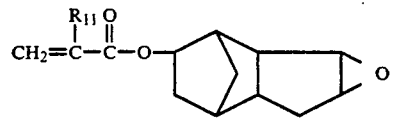

(1)

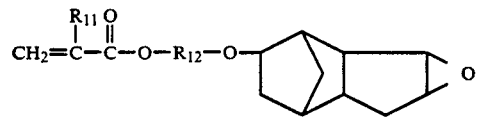

(2)

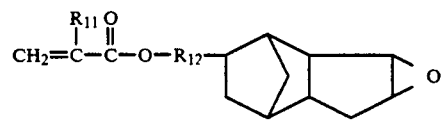

(3)

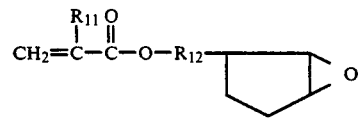

(4)

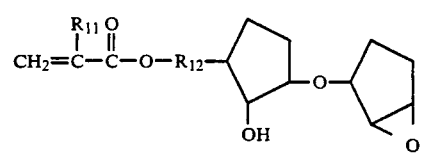

(5)

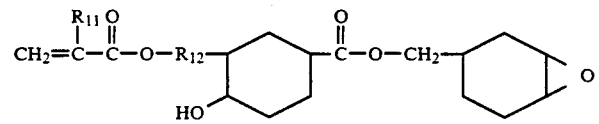

(6)

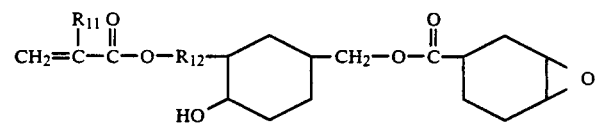

(7)

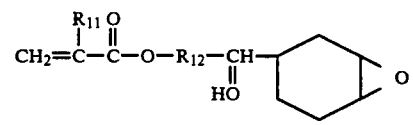

(8)

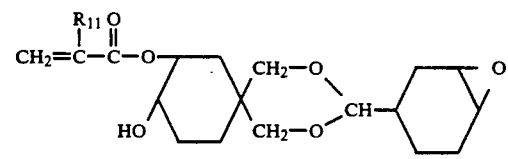

(9)

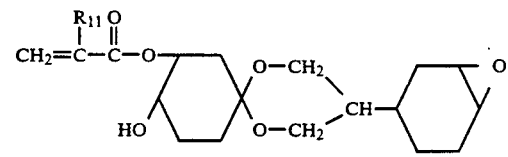

10

-continued

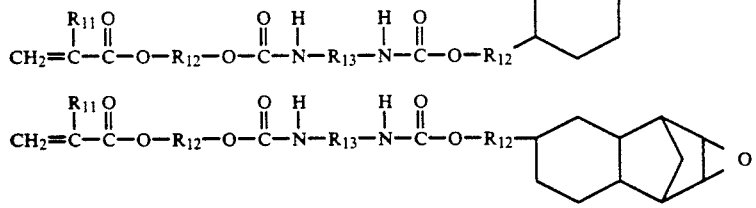

In said general formulae, $R_{11}$ represents a hydrogen atom or a methyl group, $R_{12}$ represents a divalent aliphatic saturated hydrocarbon group having 1 to carbon atoms, and $R_{13}$ represents a divalent hydrocarbon group having 1 to 10 carbon atoms.

In the aforesaid copolymerizable epoxy monomers, as a divalent aliphatic saturated hydrocarbon group having 1 to 6 carbon atoms represented by $R_{12}$, there may be cited a straight chain linear or branched chain alkylene group such as, for example, methylene, ethylene, propylene, tetramethylene, ethylethylene, pentamethylene and hexamethylene. As a divalent hydrocarbon group having 1 to 10 carbon atoms represented by $R_{13}$, there may be cited, for example, methylene, ethylene, propylene, tetramethylene, ethylethylene, pentamethylene, hexamethylene, polymethylene, phenylene,

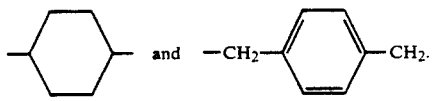

Specific examples of the polymerizable epoxy monomers represented by the aforesaid general formulae ① to 12 include 3,4-epoxycyclohexylmethyl acrylate and 3,4-epoxycyclohexylmethyl methacrylate. They are commercially available, for example, under trade names of "METHB" and "AETHB", both products of Daicel Chemical Industries, Ltd. They have the epoxy functional group represented by said formula (I) or (II). Further, 4-vinylcyclohexene oxide may also be used as a polymerizable epoxy monomer.

The epoxy resin (B) may be produced by polymerizing one kind or at least two kinds of monomers selected from these polymerizable epoxy monomers, and at this time, it is also possible to copolymerize the other polymerizable unsaturated monomer.

As said the other polymerizable unsaturated monomer, it may be selected from a broad range according to the properties desired of the resulting (co)polymer. Typical examples of such other polymerizable unsaturated monomer include the following compounds.

(a) Acrylic acid or methacrylic acid esters: for example, alkyl esters having 1 to 18 carbon atoms of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl esters having 2 to 18 carbon atoms of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; alkenyl esters having 2 to 8 carbon atoms of acrylic acid or methacrylic acid such as allyl acrylate and allyl methacrylate; hydroxyalkyl esters having 2 to 8 carbon atoms of acrylic acid or methacrylic acid such as 2-hydroxyethyl acrylate, 2-hydroxyethyl methacrylate, hydroxypropyl acrylate and hydroxypropyl methacrylate; and alkenyloxyalkyl esters having 3 to 18 carbon atoms of acrylic acid or methacrylic acid such as allyloxyethyl acrylate and allyloxyethyl methacrylate.

(b) Vinyl aromatic compounds: for example, styrene, alpha-methyl styrene, vinyl toluene and p-chlorostyrene.

(c) Polyolefin type compounds, for example, butadiene, isoprene and chloroprene.

(d) Others: acrylonitrile, methacrylonitrile, methylisopropenyl ketone, vinyl acetate, VEOBA monomer (a product of Shell Chemicals), vinyl propionate, vinyl pivalate and a compound having a polycaprolactam chain (for example, FM-3X monomer, a trade name of a product of Daicel Chemical Industries, Ltd.)

The ratio of the polymerizable epoxy monomer to the other polymerizable unsaturated monomer may be optionally selected according to the object, within such a range as to enable the epoxy resin (B) obtained by these copolymerization reactions to contain at least 2, preferably at least 3, more preferably at least 4, epoxy functional groups on average in one molecule. But in order to invest the resulting polymer with sufficient curability, it is especially preferable to make the content of the polymerizable epoxy monomer in the solids content of said epoxy resin (B) within the range of 5 to 100% by more preferably 20 to 100% by weight.

Said third process for the production of the epoxy resin (B) may be carried out in the same manner as the polymerization reaction of ordinary acryl or vinyl resin monomers. As one of such polymerization reactions, a process which comprises dissolving or dispersing the respective monomer components in an organic solvent, and heating the resulting solution or dispersion at a temperature of about 60° to 180° C. with stirring in the presence of a radical polymerization initiator, may be shown. The reaction time may be normally about 1 to 10 hours. As the organic solvent, alcohol solvents, ether solvents, ester solvents and hydrocarbon solvents may be used. When the hydrocarbon solvent is used, it is preferable to use another cosolvent together with it from the stand-point of the solubility. Further, all of usually used radical polymerization initiators may be used. As the specific examples of such radical initiator, there may be exemplified peroxides such as benzoyl peroxide and t-butyl peroxy-2-ethyl hexanoate; and azo compounds such as azobisisobutyronitrile and azobisdimethylvaleronitrile.

It is preferable that the epoxy resin (B) obtained by said third process for the production has a number average molecular weight within the range of generally about 3,000 to about 100,000, especially 4,000 to 10,000.

Of the aforesaid curing resins (B), the epoxy resin is most suitable having at least 3 epoxy functional groups, more preferably at least 4 such groups, most preferably at least 5 such groups, on average per molecule, having an epoxy equivalent within the range of preferably 100 to 2,000, more preferably 150 to 500, especially preferably 150 to 250, and a number average molecular weight within the range of preferably 400 to 100,000, more preferably 700 to 50,000, especially preferably 700 to 30,000.

The amount to use the curing resin (B) is properly changeable according to the kind of the base resin (A) used and within the range from the minimum amount enough to cure the resulting paint film thermally to the maximum amount not hurt the cationically electrodepositable paint bath stability, but generally it is desirably within such a range that the weight ratio of the solids content of the curing resin (B) to the base resin (A) becomes 0.2 to 1.0, especially 0.25 to 0.85, more desirably 0.25 to 0.65.

The resin composition of the present invention may contain the curing resin (B) together with the base resin (A) in advance.

Thus, the paint comprising the base resin (A) and the curing resin (B) may be used as a resin for a cathodically electrodepositable paint.

For preparing the cathodically electrodepositable paint for example, the base resin (A) and the curing resin (B) are mixed, then the resulting mixture is stably dispersed in water. Then, as required, the resulting aqueous dispersion is added with a color pigment such as carbon black, titanium white, white lead, lead oxide and red iron oxide; an extender pigment such as clay and talc; an anticorrosive pigment such as strontium chromate, lead chromate, basic lead chromate, red lead, lead silicate, basic lead silicate, lead phosphate, basic lead phosphate, lead tripolyphosphate, lead silico-chromate, chrome yellow, lead cyanamide, calcium plumbate, lead suboxide, lead sulfate and basic lead sulfate; or further with other additives. As the other additives that can be added, for example, a small amount of a dispersant or a nonionic surface active agent as a cissing preventing agent of the coated surface; and curing promotor may be cited.

Especially, for making an electrodeposited paint on sufficiently curable at a low temperature of not more than 160° C., it is effective to add one kind or at least two kinds of metal compound selected from among a lead compound, a zirconium compound, a cobalt compound, an aluminum compound, a manganese compound, a copper compound, a zinc compound, an iron compound, a chromium compound and a nickel compound as a catalyst.

Specific examples of these metal compounds include chelated compounds such as zirconium acetyl acetonate, cobalt acetyl acetonate, aluminum acetyl acetonate and manganese acetyl acetonate; a chelation reaction product of compounds having beta-hydroxyamino structures with lead oxide (II); and carboxylates such as lead 2-ethyl hexanoate, lead secanoate, naphthex lead, lead octanoate, lead benzoate, lead acetate, lead lactate, lead formate, lead glycoate and octanoate zircinium.

Said metal compounds may be used in an amount calculated as a metal content based on the weight of the total solids content of the base resin (A) and the curing resin (B) of generally not more than 10% by weight, preferably not more than 5% by weight.

(2) A cationically electrodepositable paint comprising (A) a resin having hydroxyl groups and cationic group; and (D) a blocked polyisocyanate compound as principal components.

As the resin (A), there can be use the same resins as the base resin (A) described on the electrodepositable paint (i) above.

On the other hand, the blocked polyisocyanate compound (D) can be obtained by addition-reation of a polyisocyanate compound with a substantially stoichiometric amount of an isocyanate-blocking agent, and is useful as a curing agent for forming a crosslinked paint film mainly by a urethanization reaction with the base resin (A) as mentioned above.

The polyisocyanate compounds include aromatic, aliphatic, and alicyclic polyisocyanate compounds which have at least two, usually and preferably 2 to 3 isocyanate groups (NCO) in one molecule. Examples thereof are polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate, and isophorone diisocyanate; and terminal isocyanate-containing prepolymers obtained by reacting such an excess amount of the polyisocyanate compound with a low molecular weight compound having an active hydrogen such as ethylene glycol, propylene glycol, trimethylolpropane, hexanetriol, or castor oil.

Among these polyisocyanate compounds, preferred are isophorone diisocyanate, xylylene diisocyanate and the like.

On the other hand, the isocyanate blocking agent is addition-reacted with one or more isocyanate groups in the polyisocyanate compound and block the isocyanate group or groups. It is important that the blocked polyisocyanate compound produced as a result of the addition reaction is stable at room temperature, and upon heated to a temperature above its dissociation temperature, releases a blocking agent to reproduce one or more free isocyanate groups.

Particularly, the cationically electrodepositable paint used in the present invention must have a film weight reduction due to curing with heating of 10% by weight or less, it is preferred to use a blocking agent having a relatively low molecular weight of 130 or less as high. Specific examples thereof include phenol type blocking agents such as phenol, cresol, xylenol, chlorophenol, and ethylphenol; lactam type blocking agents such as ε-caprolactam, δ-valerolactam γ-butyrolactam, and β-propiolactam; active methylene type blocking agents such as ethyl acetoacetate, and acetylacetone; alcohol type blocking agents such as methanol, ethanol, propanol, butanol, amyl alcohol, ethylene glycol monomethyl ether, ethylene glycol mono ethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate, and ethyl lactate; oxime type blocking agents such as formamidoxime, acetaldoxime, acetoxime, methyl ethyl ketoxime, diacetyl monoxime, and cyclohexane oxime; mercaptan type blocking agents such as butyl mercaptan, hexyl mercaptan, t-butyl mercaptan, thiophenol, methyl thiophenol, and ethyl thiophenol; amid type blocking agents such as acetamide, and benzamide; imide type blocking agents such as succinimide, and maleimide; amine type blocking agents such as xylidine, aniline, butylamine, and dibutylamine; imidazole type blocking agents such as imidazole, and 2-ethylimidazole; imine type blocking agents such as ethyleneimine, and propyleneimine; and the like. Among them, particularly preferred are the oxime type blocking agents, e.g., methyl ethyl ethoxime in view of good balance between the stability of the paint and the curability of the paint film.

As the blocked polyisocyanate compounds which can be used particularly suitably, there can be cited, for example, methyl ethyl ketoxime-diblocked isophorone diisocyanate, and methyl ethyl ketoxime-diblocked xylylene diisocyanate.

The amount to use the blocked polyisocyanate compound (D) is not critical and properly changeable according to the type of the base resin (A) used and within the range from the minimum amount enough to cure the resulting paint film thermally to the maximum amount not hurt the bath stability, but generally it is desirably within such a range that the weight ratio of the solids content of the blocked polyisocyanate compound (D) to the base resin (A) becomes 0.05 to 1.5, especially 0.1 to 0.7, more especially 0.2 to 0.5.

The base resin (A) and the blocked polyisocyanate compound (D) described above can be converted into a cationically electrodepositable paint in the same manner as in (i) above by mixing them, dispersing the mixture stably in water, optionally kneading the dispersion with the same type and amount of the coloring pigment, anticorrosive pigment, or the like additives, and/or metal catalysts.

The thickness of a paint film obtained by electrodepositing the so prepared cathodically electro-depositable paint on a proper substrate is not strictly restricted, however, generally, the thickness within the range of 3 to 300 microns based on the cured paint film is suitable, and the paint film can be cured with heating at a temperature of, for example, 70° to 250° C., preferably 120° to 160° C.

A method of forming an electrodeposited paint film on the substrate using the cathodically electro-depositable paint mentioned above is not particularly restricted, but ordinary conditions for cathodically electrodepositing may be used. For example, the base resin (A) and the epoxy curing resin (B) or the blocked polyisocyanate compound (D) are, as mentioned above, dispersed in water, the resulting aqueous dispersion is blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm×15 cm×1 cm) being used as an anode and for example, a zinc phosphated steel (5 cm×15 cm×0.7 mm) being used as a cathode.

Bath temperature: 20° to 35° C., preferably 25° 30° C.
Direct current
Current density: 0.005 to 2 A/cm$^2$, preferably 0.01 to 1 A/cm$^2$
Voltage: 10 to 500 V, preferably 100 to 300 V
Power feeding time: 0.5 to 5 min., preferably 2 to 3 min.

According to the method of the present invention, the coated substrate after the cationic electrodeposition is drawn from the electrodeposition bath, and washed with water, and then water drops on the electrodeposited film surface, more preferably substantially all the moisture contained in the electrodeposited film, are removed by hot-air drying means or the like. Thereafter, an aqueous paint is coated on the film in a wet-on-wet manner and the both paint films are cured with heating simultaneously.

Aqueous Paint

The aqueous paint used in the method of the invention is composed mainly of:

(a) a polyester resin optionally modified with a urethane and having an acid value within the range of 10 to 100 and a hydroxyl value within the range of 20 to 300; and (b) a water-soluble or -dispersible amino resin.

Hereafter, the aqueous paint will be described more concretely.

(a) Polyester Resin

Polyester resin (a) may be an ordinary type polyester resin which can be prepared by condensation reaction of an alcohol component with an acid component and has an acid group and a hydroxyl group. Specific examples thereof include oil-free polyester resins obtained by condensation of an alcohol component selected from polyhydric alcohols such as ethylene glycol, diethylene glycol, propylene glycol, butanediol, pentanediol, 2,2-dimethylpropanediol, glycerin, trimethylolpropane, and pentaerythritol; monohydric alcohols or mono-epoxy compounds having one glycidyl group in the molecule (for example, "Cadura E", (trade name for a product by Shell Co.)) optionally used together with the aforementioned polyhydric alcohol and an acid component selected from polybasic acids such as phthalic anhydride, isophthalic acid, tetrahydrophthalic anhydride, hexahydrophthalic anhydride, maleic anhydride, succinic anhydride, adipic acid, sebacic acid, trimellitic anhydride, and pyromellitic anhydride, and monobasic acids optionally used such as benzoic acid, an t-butylbenzoic acid; and oil-modified polyester resins obtained by reacting three components, i.e., the aforementioned alcohol and acid components, and an oil component selected from castor oil, dehydrated castor oil, tung oil, safflower oil, soybean oil, linseed oil, tall oil, coconut oil and the like, and fatty acid mixtures containing at least one of their fatty acids. Further, polyester resins obtained by grafting an acrylic resin or vinyl resin to the aforementioned polyester resins.

Use of urethanated polyester resin as the polyester resin (a) gives rise to an aqueous paint having further improved storage stability, anti-popping properties, distinctness of image gloss, smoothness and anti-chipping properties. Hence it is preferred to use aqueous paints containing urethane-modified polyester resins.

Such a urethane-modified polyester resins can be prepared by reacting the aforementioned polyester resin having the acid group and the hydroxyl group, preferably oil-free one, obtained from the above-exemplified alcohol and acid components with a polyisocyanated compound, preferably diisocyanate compound, in excess of hydroxyl groups. As the polyisocyanate compound which can be used for modifying the polyester, there can be cited, for example, aromatic diisocyanate compounds such as tolylene diisocyanate, and 4,4'-diphenylmethane diisocyanate; aromatic-aliphatic polyisocyanate compounds such as xylylene diisocyanate, and m- or p-tetramethylxylylene diisocyanate; aliphatic or alicyclic polyisocyanates such as hexamethylene diisocyanate, and isophorone diisocyanate, and biuretated compounds thereof, and isocyanurated compounds thereof, trimethylhexamethylene diisocyanate, hydrogenated xylene diisocyanate, and hydrogenated 4,4'-diphenylmethane diisocyanate. Among them, preferred are tolylene diisocyanate, xylylene diisocyanate, and isophorone diisocyanate from the viewpoints of increase in the storage stability of aqueous paints prepared therewith.

While the amount of the polyisocyanate compound to be used may be varied within a wide range depending on the type of polyester resin to be modified and degree of its modification, generally it is favorably to use the polyisocyanate compound within the range of 1 to 40% by weight, preferably 4 to 30% by weight, more preferably 4 to 20% by weight, based on the weight of the polyester.

It is important that the polyester resin (a) used in the aqueous paint according to the present invention has an acid value within the range of 10 to 100, preferably 10 to 80, and more preferably 10 to 60; and a hydroxyl value within the range of 20 to 300, preferably 30 to 200, and more preferably 30 to 160. If the acid value of the polyester resin used is smaller than 10, the polyester resin is difficult to be dispersed in aqueous media. On the contrary the acid value exceeding 100 leads to a tendency that the paint film formed has decreased resistances to water and chemicals. If the hydroxyl value of the polyester resin is smaller than 20, the paint film formed has insufficient curability while if it exceeds 300 the paint film formed tends to have decreased resistances to water and chemicals.

The polyester resin (a) has a weight average molecular weight within the range of generally 1,000 to 20,000, and preferably 3,000 to 15,000.

The polyester resin (a) having the aforementioned characteristics can be dissolved or dispered in water by neutralizing at least 20%, preferably at least 40%, of the existing acid groups with a basic substance. As the basic substance used in the neutralization, there can be cited, for example, ammonia, methylamine, ethylamine, dimethylamine, diethylamine, trimethylamine, triethylamine, dimethylethanolamine, diethanolamine, triethanolamine, and the like. Among them preferred are mono- di- or trialkanolamines such as diethanolamine, dimethylethanolamine, and triethanolamine.

(b) Amino Resin:

Amino resin (b), which is useful as a cross-linking agent for crosslinking the aforementioned polyester resin component in aqueous paints, may be, for example, di-, tri-, tetra-, penta- and hexmethylolmelamines and their alkyl (preferably methyl) etherated compounds; and urea-formaldehyde condensates; ureamelamine copolycondensaiton products.

The amino resin (b) is desirably hydrophilic to such an extent that it is water-soluble or can be dispersed in water stably without causing phase separation or sedimentation. Particularly preferred are melamine derivatives such as di-, tri-, tetra-, penta- and hexamethylol-melamines and their alkyl (preferably methyl) etherated compounds.

Relationship between the aforementioned preferred melamine derivatives and the performances of painted film formed with aqueous paints containing the melamine derivatives are as explained below.

(1) Use of fully etherated compound the methylolated melamines results in increased resistance to the popping of the painted film but crosslinking reaction temperature tends to be so high that in order to cure the paint film at a temperature on the order of 140° to 150° C., the crosslinking reaction can proceed insufficiently unless an acid catalyst is used (ii) With melamines having methylol groups (—CH$_2$OH) and ether groups (—CH$_2$OR) in coexistence, initial curing rate of the paint film is high and hence no need for acid catalysts while curing starts on the surface of the paint film before water or solvents sufficiently volatilize from the coated paint film, which could cause the popping to occur.

(iii) Melamines having imino groups (>NH) and alkyl ether groups (—CH$_2$OR) in coexistence are susceptible to crosslinking reaction with the polyester resin at 140° to 150° C. in the absence of acid catalysts. The crosslinking reaction proceeds at a relatively low rate and self-curing is not so fast as methylol groups. Therefore, crosslinking-curing does not start before organic solvents, water and the like are volatilize and the paint film is molten and flows, thus forming a paint film having an excellent smoothness, and a good curability without causing popping.

Therefore, water-soluble or -dispersible amino resins having one or more imino groups, for example, imino group-containing melamine resins, are most suitable as the amino resin to be used in the aqueous paint.

(c) Alkyl Etherated Benzoin:

The aqueous paint which can be used in the present invention may if desired contain an alkyl etherated benzoin (c) in addition to the aforementioned two main components, i.e., polyester resin (a) and amino resin (b). Blending of the alkyl etherated benzoin is favorable because the occurance of popping or sagging of the aqueous paint can be decreased considerably, and the smoothness, distinctness of image gloss and other properties can be further improved resulting aqueous paint.

The alkyl etherated benzoin (c) is an alkyl (preferably having 1 to 4 carbon atoms) etherated derivative of benzoin, specific examples of which include benzoin methyl ether, benzoin ethyl ether, benzoin n-propyl ether, benzoin isopropyl ether, benzoin n-butyl ether, benzoin iso-butyl ether and the like. They can be used singly or two or more of them can be used in combination. Among them, particularly preferred are benzoin ethyl ether and benzoin methyl ether.

Method for the introduction of the alkyl etherated benzoin in the aqueous paint is not limited particularly and it can be introduced by various methods, for example, (1) a method in which the alkyl etherated benzoin is added when a pigment is dispersed; (2) a method in which the etherated benzoin is added to an aqueous solution of the polyester (a) at room temperature or at an elevated temperature and mixed with stirring; or (3) the alkyl etherated benzoin is added when the polyester resin (a) is prepared. Any one of these methods does not adversely affect improvement of popping but generally a suitable method is selected taking into consideration the contents of pigments in the paint and the melting point of the alkyl etherated benzoin used. Among the aforementioned methods, the method (2) is preferred.

The alkyl etherated benzoin prevents the occurrence of popping of the aqueous paint and is effective for increasing film thickness at which popping occurs.

The aqueous paint used in the method of the present invention can be prepared by dissolving or dispersing the aforementioned polyester resin (a), amino resin (b) and optionally alkyl etherated benzoin (c) in an aqueous medium. Blend ratios of the respective components are not critical, and may be varied widely depending on the physical properties of the paint film required for the aqueous paint formed. Generally, the polyester resin (a) is contained in an amount within the range of 50 to 90% by weight, preferably 55 to 85% by weight, and more preferably 60 to 80% by weight, based on total weight of the polyester resin (a) and the amino resin (b); the amino resin (b) is contained in an amount within the range of 50 to 10% by weight, preferably 45 to 15% by weight, and more preferably 40 to 20% by weight, based on total weight of the polyester resin (a) and the amino resin (b). When the alkyl etherated benzoin (c) is to be used, it is contained in an amount of 0.1 to 10% by weight, preferably 0.5 to 5% by weight, and more preferably 1 to 3% by weight, based on total weight of the polyester resin (a) and the amino resin (b).

The aqueous paint used in the method of the invention may further contain various modifiers and aids such as a sagging preventer, a defoamer, a leveling agent, a boiling preventer, a curing promoter (acid catalyst) and the like as required. It is also possible to blend organic solvents which are freely miscible with water such as alcohols, ether-alcohol mixtures, esters, ketones in amounts not more than 20% by weight, and preferably not more than 15% by weight, based on the solid resin content (weight).

In order to improve the film thickness retention property of the paint film, coating workability, and physical properties of the paint film, inorganic pigments such as titanium oxide, barium sulfate, calcium carbonate and clay, and combinations of such inorganic pigments with various pigments for coloring may be blended in amounts within the range of usually 1 to 200 parts by weight, and particularly 70 to 120 parts by weight, per 100 parts by weight of total solid resin.

The aqueous paint prepared as described above is adjusted with water so as to have a suitable viscosity for coating and then is coated by a coating method for itself such as spray coating method or an electrostatic coating method on an uncured film of a cationically electrodepositable paint formed as described above in a wet-on-wet process. The thickness of coated film may generally be within the range of 30 to 50 micrometers in a flat portion based on cured film thickness.

The multilayer paint film comprising the cationically electrodepositable paint film and the aqueous paint film thus formed is heated so as to cure the component films simultaneously. Heating temperature suitable for curing the both component films is not critical but may be varied depending on the types of the component films. Suitable heating temperature is within the range of usually 70° to 250° C., and preferably 120° to 160° C.

In the present invention, the paint film of the aqueous paint serves also as a topcoat film and hence the method of the invention can be used for two-coat finishment obtained by coating the both cationically electrodepositable paint and the aqueous paint. Most preferably, the aqueous paint is utilized as an intercoat paint in order to coat thereon a topcoat paint (of solid color or metallic finishment).

Hereinbelow, the present invention will be explained more specifically by examples. All parts and percentages in the following examples are by weight.

I. PRODUCTION EXAMPLES

I-1. Production of Base Resin (A)

(1) Base resin (A-1)

Bisphenol A type epoxy resin having an epoxy equivalent of 950 (trade name "Epicoat 1004", a product of Shell Chemicals Co., Ltd.) (1900 parts) was dissolved in 993 parts of butyl cellosolve, to the resulting solution, 210 parts of diethanol amine was added dropwise at a temperature of 80° to 100° C., then the resultant mixture was maintained at 100° C. for 2 hours to obtain a base resin (A-1) having a resin solids content of 68%, a primary hydroxyl equivalent of 528 and an amine value of 53.

(2) Base Resin (A-2)

To 39 parts of monoethanol amine maintained at 60° C. in a reactor, 100 parts of N,N-dimethylaminopropylacrylamide was added dropwise, the mixture was reacted at 60° C. for 5 hours to obtain a monoethanolamine adduct of N,N-dimethylaminopropylacrylamide.

Separately, a reactor was charged with 950 parts of bisphenol A diglycidylether having an epoxy equivalent of 190, 340 parts of propylene glycol diglycidylether having an epoxy equivalent of 340, 456 parts of bisphenol A and 21 parts of diethanolamine, the content was heated to 120° C. and reacted until the epoxy value became 1.02 mmole/g, then the reaction product was diluted with 479 parts of ethylene glycol monobutyl ether, cooled, and while the reaction system was maintained at 100° C., 158 parts of diethanol amine and 43 parts of a monoethanol amine adduct of said N,N-dimethylaminopropylacryl amide were added thereto, and the resulting mixture was reacted until the viscosity ceased to raise to obtain a base resin (A-2) having a resin solids content of 80%, a primary hydroxyl group equivalent of 518 and an amine value of 54.

(3) Base Resin (A-3)

A reactor was charged with 950 parts of bisphenol A diglycidyl ether having an epoxy equivalent of 190, 330 parts of an epoxy resin XB-4122 (a trade name of a product of Ciba Geigy Ltd.) having an epoxy equivalent of 330, 456 parts of bisphenol A and 21 parts of diethanol amine, the content was heated to 120° C. and reacted until the epoxy value became 1.02 mmole/g, then the reaction product was diluted with 489 parts of ethylene glycol monobutyl ether, cooled, thereafter while the reaction system was maintained at 90° C., 126 parts of diethanol amine, 53.5 parts of monoethanol amine adduct of said N,N-dimethylaminopropylacryl amide and 18.5 parts of N-methylaminoethanol were added thereto, and the resulting mixture was reacted until the viscosity ceased to rise to obtain a base resin (A-3) having a resin solids content of 80%, a primary hydroxyl group equivalent of 592 and an amine value of 55.

I-2. Production of Curing Resin (B)

(1) Curing Resin (B-1)

"EHPE.3150" [trade name of the epoxy resin having an epoxy equivalent of 175 to 195, a product of Daicel Chemical Industries, Ltd.] (32.6 parts) and 8.2 parts of propylene glycol monomethyl ether were dissolved under heating at 100° C. to obtain 40.8 parts of a curing resin (B-1) having a solids content of 80% and an epoxy equivalent of 190. Said curing resin had a number average molecular weight of about 1,500.

(2) Curing Resin (B-2)

To a mixture of 136 parts of vinyl norbornene oxide, 124 parts of 4-vinylcyclohexene-1-oxide and 18 parts of trimethylol propane, 200 parts of a 10% ethyl acetate solution of BF$_3$-etherate was added dropwise at 50° C. over 4 hours to carry out a ring-opening polymerization. The resultant ring-opened polymer was added with ethyl acetate, washed with water, the ethyl acetate layer was concentrated, then 130 parts of ethyl acetate was added anew and dissolved, 160 parts of peracetic acid was made into an ethyl acetate solution and added dropwise at 50° C. over 5 hours, and the resultant mixture was matured for 2 hours 50° C. to carry out an epoxidation reaction. After removing acetic acid, ethyl acetate and peracetic acid, the remaining epoxidation product was dissolved in 500 parts of ethyl acetate at 40° C., followed by washing with 250 parts of distilled water 4 times, then ethyl acetate was removed, then the matured product was dissolved in 78 parts of propylene glycol monomethyl ether at 80° C. to obtain a curing resin (B-2) having a solids content of 80% and an epoxy equivalent of 202. Said curing resin had a number average molecular weight of about 1,300.

(3) Curing Resin (B-3)

To a mixture of 304 parts of partially epoxidated lemonene (2-methyl-4-isopropenyl-1-cyclohexene oxide) and 18 parts of trimethylol propane, 200 parts of a 10% ethyl acetate solution of BF$_3$-etherate was added dropwise at 50° C. over 4 hours. The treatment thereafter was carried out as in the curing resin (B-2), and the matured product was dissolved in 80 parts of ethylene glycol monobutyl ether at 80° C. to obtain a curing resin (B-3) having a solids content of 80% and an epoxy equivalent of 205. Said curing resin had a number average molecular weight of about 1,000.

(4) Curing Resin (B-4)

The process (2) for producing a curing resin (B-2) was repeated except that 304 parts of 2,4 (or) 1,4-dimethyl-4-ethenyl-1-cyclohexane oxide was used to obtain a curing resin (B-4) having a solids content of 80% and an epoxy equivalent of 199. Said curing resin had a number average molecular weight of about 950.

(5) Curing Resin (B-5)

To a mixture of 460 parts of "Celoxide 3000"

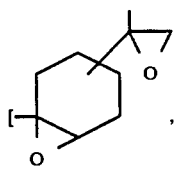

a trade name of a product of Daicel Chemical Industries, Ltd.], 0.3 part of aluminum acetyl acetonate and 5 parts of tetraethoxy silane, 0.1 part of distilled water was added, the mixture was maintained at 80° C. for 1 hour, then reacted at 120° C. for 3 hours, then to the reaction product was added 116 parts of ethylene glycol monobutyl ether to obtain a curing resin (B-5) having a solids content of 80% and an epoxy equivalent of 280.

Said curing resin has a number average molecular weight of about 1,100.

(6) Curing Resin (B-6)

A cyclopentadiene dimer (132 parts) was dissolved in 70 parts of ethyl acetate, to the resulting solution, 160 parts of peracetic acid as an ethyl acetate solution was added dropwise at 35° C. over 7 hours, and the mixture was further matured at 40° C. for 6 hours. After removal of acetic acid, ethyl acetate and peracetic acid, the matured product was dissolved at 40° C. in 500 parts of ethyl acetate, followed by washing with 250 parts of distilled water 5 times, then ethyl acetate was removed and the matured product was dissolved at 80° C. in 43 parts of methylisobutyl ketone to obtain a compound (1) having a solids content of 80% and an epoxy equivalent of 90. 4-Vinylcyclohexene (94 parts) was dissolved in 75 parts of ethyl acetate, to the resulting solution, 160 parts of peracetic acid made into an ethyl acetate solution was added dropwise at 50° C. over 4 hours, and further matured at 50° C. for 2 hours. After removal of acetic acid, ethyl acetate and peracetic acid, the matured product was dissolved in 500 parts of ethyl acetate at 40° C., followed by washing with 250 parts of distilled water 5 times, then ethyl acetate was removed, and the matured product was dissolved at 80° C. in 32 parts of methylisobutyl ketone to obtain a compound (2) having a solids content of 80% and an epoxy equivalent of 65. To a mixture of 225 parts of the compound (1) and 163 parts of the compound (2), 0.2 part of aluminum acetyl acetonate and 10 parts of trimethylol propane were added, the resulting mixture was maintained at 100° C. for 1 hour, then reacted at 150° C. for 3 hours, then 60 parts of ethylene glycol monobutyl ether was added to cool the system to thereby obtain a curing resin (B-6) having a solids content of 70% and an epoxy equivalent of 210. Said curing resin had a number average molecular weight of about 1,100.

(7) Curing Resin (B-7)

Azobisdimethylvaleronitrile (2 parts) dissolved in 33.4 parts of METHB monomer (3,4-epoxycyclohexylmethyl methacrylate) was added dropwise to a mixed solvent of 10 parts of methylisobutyl ketone and 10 parts of butyl cellosolve heated at 100° C. over 2 hours, the resulting mixture was matured for 1 hour, then heated to 125° C., at which temperature the matured mixture was further matured for 1 hour to obtain 54 parts of a curing resin (B-7) having a solids content of 60% and an epoxy equivalent of 196. Said curing resin had a number average molecular weight of about 10,000.

(8) Curing Resin (B-8)

Azobisdimethylvaleronitrile (2.4 parts) dissolved in a mixture of 32.0 parts of an METHB monomer and 8.0 parts of hydroxyethyl acrylate was added dropwise to 24 parts of butyl cellosolve heated at 100° C. over 2 hours, and matured for 1 hour, then the system was heated at 125° C., and again matured for 1 more hour to obtain 64.8 parts of a curing resin (B-8) having a solids content of 60% and an epoxy equivalent of 245. Said curing resin had a number average molecular weight of about 12,000.

(9) Curing Resin (B-9)

Azobisdimethylvaleronitrile (2.4 parts) dissolved in a mixture of 37 parts of 3,4-epoxycyclohexylmethyl acrylate and 3 parts of hydroxyethyl acrylate was treated in the same way as in the preceding process for the production of a curing resin (B-8) to obtain a curing resin (B-9) having a solids content of 60% and an epoxy equivalent of 200. Said curing resin had a number average molecular weight of about 15,000.

I-3. Production of Pigment Paste

Pigment paste (P-1)

A base resin (12.5 parts) was added with 4.4 parts of 10% formic acid, to which 15 parts of deionized water was added with stirring, the resulting mixture was further added with 10 parts of titanium white, 10 parts of clay, 1 part of carbon and 2 parts of basic lead silicate. The resulting mixture was dispersed in a ball mill for 24 hours, then added with 11 parts of deionized water to obtain a paste (P-1) having a solids content of 50%.

The base resin was the same as used in each Example shown in Table 1.

I-4 Production of Cationically Electrodepositable Paint (K-1)

The above base resin, curing resin and pigment paste were mixed in amounts shown in Table 1 to obtain a paint (K-1).

TABLE 1

| Cationically Depositable Paint | Base Resin | | Curing Resin | | Aqueous 10% Formic Acid Solution | Octix lead | pH |
|---|---|---|---|---|---|---|---|
| | Name | Amount | Name | Amount | | | |
| K-1-1 | A-1 | 86 | B-1 | 30 | 42 | 3.4 | 5.6 |
| K-1-2 | A-2 | 86 | B-2 | 30 | 21 | 3.4 | 6.4 |
| K-1-3 | A-3 | 86 | B-3 | 30 | 21 | 3.4 | 6.4 |
| K-1-4 | A-1 | 86 | B-4 | 40 | 25 | 3.4 | 5.6 |
| K-1-5 | A-2 | 86 | B-5 | 40 | 21 | 3.4 | 6.4 |
| K-1-6 | A-3 | 86 | B-6 | 40 | 21 | 3.4 | 6.4 |
| K-1-7 | A-1 | 86 | B-7 | 50 | 25 | 3.4 | 5.6 |
| K-1-8 | A-2 | 86 | B-8 | 50 | 21 | 3.4 | 6.4 |
| K-1-9 | A-3 | 86 | B-9 | 50 | 21 | 3.4 | 6.4 |

In Table 1, the respective amounts of the base resin, and curing resin are indicated as solid content of resin, and these were mixed with water to adjust solid content ratio to 20%, and 92 parts of the aforementioned pigment paste (P-1) and deionized water were blended to prepare an electrodeposition bath having a solid content ratio of 20%.

I-5 Production of Cationically Electrodepositable Paint (K-2)

(1) Base Resin (a-4)

| (1) Bisphenol type epoxy resin ("Araldite #6071", trade name, produced by Ciba Geigy Ltd.) | 930 parts |
|---|---|
| (2) Bisphenol type epoxy resin ("Aralidite GY2600", trade name, produced by Ciba Geigy Ltd.) | 380 parts |
| (3) Polycaprolactonediol ("Praxel #205", trade name, produced by Daicel Chemical Industries, Ltd.) | 550 parts |
| (4) Dimethylbenzylamine acetate | 2.6 parts |
| (5) p-Nonylphenol | 79 parts |
| (6) Methyl isobutyl ketone-ketiminated monoethanolamine | 71 parts |
| (7) Dietanolamine | 105 parts |
| (8) Butylcellosolve | 180 parts |
| (9) Cellosolve | 525 parts |

Components (1) to (6) above were mixed reacted at 150° C. for 2 hours. Thereafter, components (7) to (9) were blended with the reaction mixture and the resulting mixture was reacted at 80° to 90° C. for 3 hours to obtain a base resin having a solid content of 75% (A-4).

(2) Pigment Paste

A pigment paste having a solid content of 50% was obtained which was composed of:

| Quaternarized base resin with solid content ratio being adjusted to 60% (a-4) | 5.73 parts |
|---|---|
| Titanium white | 14.5 parts |
| Carbon | 0.54 part |
| Extender pigment (clay) | 7.0 parts |
| Lead silicate | 2.3 parts |
| Dibutyltin oxide | 2.0 parts |
| Deionized water | 27.49 parts |

(3) Production of Cationically Electrodepositable Paint (K-2)

Two types of aqueous emulsions each having a solid content of 32% were prepared using the aforementioned base resin. The composition and blend amounts are shown in Table below.

| | K-2-1 | K-2-2 |
|---|---|---|
| (1) Base resin (a-4) | 112 parts | 112 parts |
| (2) Methyl ethyl ketoxime-diblocked isophorone diisocyanate | 16.0 parts | 12.4 parts |
| (3) Methyl ethyl ketoxime-diblocked xylylene diisocyanate | — | 3.6 part |
| (4) Polypropylene glycol 4000 | 1.0 part | 1.0 part |
| (5) Lead acetate | 1.0 part | 1.0 part |
| (6) 10% Acetic acid | 9.3 parts | 9.3 parts |
| (7) Deionized water | 179.45 parts | 179.45 parts |

Then 318.75 parts of the aqueous emulsion was mixed with 59.56 parts of the aforementioned pigment paste and 280.59 parts of deionized water to prepare a cationically electrodepositable bath having a solid content of 20%.

I-6. Production of Aqueous Paint (1) Polyester Resin (1-1) Polyester Resin (a-1)

A polyester resin obtained by reacting a mixture of 19.6 parts of ethylene glycol, 18.5 parts of trimethylolpropane, and 46.7 parts of phthalic anhydride at 160° to 230° C. for 7 hours was reacted with 15.7 parts of tolylene diisocyanate at 120° C. Thereafter, 5.2 parts of trimellitic anhydride was added thereto and the mixture was reacted at 180° C. for 1 hour to obtain a urethane-modified polyester resin (a-2) having a weight average molecular weight of 6,000, an acid value of 40 and a hydroxyl value of 112.

(1-2) Polyester Resin (a-2):

A polyester resin obtained by reacting 19.3 parts of ethylene glycol, 18.2 parts of trimethylolpropane and 46.2 parts of phthalic anhydride at 160 to 230° C. for 7 hours was reacted with 16.8 parts of xylene diisocyanate at 120° C. Then, 5.1 parts of trimellitic anhydride was added thereto, and the mixture was reacted at 180° C. for 1 hour to obtain an urethane modified polyester resin (a-2) having a weight average molecular weight of 6,200, an acid value of 40 and a hydroxyl group of 110.

(1-3) Polyester resin (a-3):

A polyester resin obtained by reacting a mixture of 27.7 parts of ethylene glycol, 10.3 parts of glycerin, and 50.0 parts of phthalic anhydride at 160 to 230° C. for 7 hours was reacted with 9.7 parts of tolylene diisocyanate at 120° C. Thereafter, 8.3 parts of phthalic anhydride was added thereto and the mixture was reacted at 160° C. for 3 hours to obtain a urethane-modified polyester resin (a-3) having a weight average molecular weight of 4,500, an acid value of 50 and a hydroxyl value of 200.

(2) Production of Aqueous Paint

The aforementioned polyester resin and other components were mixed and dispersed in blend amounts shown in Table 2 to obtain aqueous paints (S-1) to (S-5), respectively.

TABLE 2

| Aqueous Paint | | S-1 | S-2 | S-3 | S-4 | S-5 |
|---|---|---|---|---|---|---|
| (a) Component | Name (1*) | a-1 | a-2 | a-3 | a-2 | Conventional organic solvent type intercoat paint |
| | Blend amounts | 80 | 75 | 70 | 75 | |
| (b) Component | Name (2*) | b-1 | b-1 | b-1 | b-1 | |
| | Blend amounts | 20 | 25 | 30 | 25 | |
| (c) Component | Name (3*) | c-1 | c-1 | c-1 | — | |
| | Blend amounts | 2 | 2 | 2 | — | |
| Pigment | | 100 | 100 | 100 | 100 | |
| Organic Solvent (4*) | | 15 | 15 | 15 | 15 | |

In Table 2, respective blend amounts of components (a) to (c) are based on solid contents, and conventional organic solvent type intercoat paint used in B-5 is "Amilac Sealer" (trade name for a polyester resin type, produced by Kansai Paint Co., Ltd.).

(1*) Name of Component (a)
  a-1 to a-3 are those obtained in (1) of said Production Example I-6.

(2*) Name of Component (b)
  (b-1): "Cymel 703" (imino group-containing melamine resin, produced by Mitsui Cyanamide Co., Ltd.)

(3*) Name of component C:
  (c-1): Benzoin ethyl ether (4*) Organic Solvent: diethylene glycol monoethyl ether Respective blend amounts of components (a), (b) and (c) are based on 100 parts by weight of total solid content in components (a), (b) and (c).

As the pigment, 80 parts of titanium white, 20 parts of barium sulfate and 0.3 part of carbon black per 100 parts by weight of total solid content of components (a) and (b).

These pigments were charged in a vessel together with a portion of component (a) and deionized water, and dispersed using glass beads as a dispersion medium in 1 hour so that particle size of particles measured by a grindometer became 5 micrometers or less.

II. EXAMPLES

In respective cationically electrodepositable paint baths controlled at 30° C. were dipped steel plates treated with zinc phosphate and electrodeposited at 200 to 300 V for 3 minutes and the electrodeposited plates were drawn from the baths, washed with water, and hydroextraciton-dried at 100° C. for 10 minutes. Thereafter, one of the aqueous paints (S-1) to (S-5) was spray-coated on the uncured electrodeposited surface in a wet-on-wet process, and left at room temperature for 5 minutes, followed by heating to cure the both paint films.

The coating steps and results of tests on the performances of the paint films formed are shown in Table 3.

TABLE 3

| | | Example | | | | | | | | | | | | Comparative Example | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 |
| Cationic electrodeposition coating | Name | K-1-1 | K-1-2 | K-1-3 | K-1-4 | K-1-5 | K-1-6 | K-1-7 | K-1-8 | K-1-9 | K-2-1 | K-2-2 | K-1-1 | K-3 | K-1-2 | K-1-2 |
| | Film thickness | 20–25 μ (as cured paint film) | | | | | | | | | | | | | | |
| | Drying | 100° C. - 10 minutes | | | | | | | | | | | | 160° C. - 30 minutes | | |
| Aqueous paint coating | Name | S-1 | S-2 | S-3 | S-1 | S-2 | S-3 | S-1 | S-2 | S-3 | S-1 | S-2 | S-4 | S-1 | S-1 | S-5 |
| | Film thickness | 40–45 μ (as cured paint film) | | | | | | | | | | | | | | |
| Baking conditions | | 160° C. - 30 minutes | | | | | | | | | | | | | | |
| Topcoat coating | Name | "Amilac (Black)" | | | | | | | | | | | | | | |
| | Film thickness | 40–45 μ (as cured paint film) | | | | | | | | | | | | | | |
| | Baking | 140° C. - 30 minutes | | | | | | | | | | | | | | |
| Weight reduction of electrodeposited film by heating | | 3.6 | 3.3 | 3.7 | 3.5 | 3.2 | 3.7 | 3.6 | 3.4 | 3.4 | 4.5 | 4.8 | — | 13 | — | — |
| Up to coating of aqueous paint | leg sagging | 65 | 65 | 65 | 65 | 65 | 65 | 65 | 65 | 65 | 65 | 65 | 65 | 65 | 65 | 65 |
| | smoothness | ○ | ○ | ○ | ○ | ○ | ○ | ○ | ○ | ○ | ○ | ○ | △ | △ | ○ | ○ |
| | hardness | 15 | 15 | 15 | 15 | 15 | 15 | 15 | 15 | 15 | 15 | 15 | 16 | 15 | 15 | 9 |
| | curability | ○ | ○ | ○ | ○ | ○ | ○ | ○ | ○ | ○ | ○ | ○ | △ | ○ | ○ | ○ |
| Paint film formed by topcoat coating | anti-chipping | ○ | ○ | ○ | ○ | ○ | ○ | ○ | ○ | ○ | ○ | ○ | ○ | ○ | ○ | ○ |
| | adhesion | ○ | ○ | ○ | ○ | ○ | ○ | ○ | ○ | ○ | ○ | ○ | ○ | ○ | ○ | ○ |
| | Resistance | ○ | ○ | ○ | ○ | ○ | ○ | ○ | ○ | ○ | ○ | ○ | ○ | ○ | ○ | ○ |

TABLE 3-continued

|  | Example |  |  |  |  |  |  |  |  |  |  |  | Comparative Example |  |  |
|---|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 | 3 |
| to humidity |  |  |  |  |  |  |  |  |  |  |  |  |  |  |  |

In table 3, (Note 1) Cationically electrdodepositable paint (K-3) was prepared in the same manner as the cationically electrodepositable paint K-2-1) except that methyl ethyl ketoxime (blocking agent) of diblocked isophorone diisocyanate in the aforementioned cationically electrodepositable paint K-2-1) was replaced by diphenylmethane diisocyanate diblocked with 2-ethylhexyl glycol.

(Note 2) Drying the cationically electrodeposited paint film at 100° C. for 10 minutes after washing it with water resulted in removal of almost all moisture by volatilization-while no crosslinking reaction (curing) did occur. Heating at 160° C. for 30 minutes (baking) let to curing by crosslinking.

(Note 3). "Amilac Black" used as a topcoat paint is a trade name for melamine/polyester based organic solvent type thermosetting paint produced by Kansai Paint Co., Ltd.

(Note 4) Methods of Testing Performance Tests

Of the following items, items (3) to (5) were tested on coated plates coated with the cationically electrodepositable paint and aqueous paint and cured with heating as described above. Items ( 6 ) to ( 9 ) were tested on coated plates which were coated with Amilac Black on their cured, aqueous paint-coated surfaces followed by baking at 140° C. for 30 minutes.

(1) Weight Reduction by Heating

A copper plate having a weight Wo was cationically electrodeposited at 30° C. at 200 to 300 V for 3 minutes in an electrodeposition bath, drawn from the bath, and washed with water. After removing all or almost all the moisture in the resulting paint film by heating it at 105° C. for 3 hours, the weight (Y) of the paint film was measured, and then the paint film was heated at 170° C. for 20 minutes to three-dimensionally cure it, followed by measurement of the weight (Z) of the paint film. These measured values were introduced in the following formula, and the weight reduction (X) of the paint film was calculated.

$$X(\%) = \left[\frac{Y-Z}{Y}\right] \times 100$$

(2) Limit Film Thickness for Sagging

Using 10×45 cm-steel plates each of which was treated with zinc phosphate and had a series of holes 10 mm in diameter formed along a longer side thereof at a distance of 4 cm were cationically electrodeposited (thickness: 20 micrometers as cured paint film), and hydroextraction-dried. From immediately after coating with an aqueous paint up to setting and baking, the plates were held vertically (so that the holes were arranged horizontally). Limit film thickness (unit: micrometers) for sagging was defined as the maximum film thickness at which no sagging defect was observed in the circumference of the holes under such conditions.

(3) Smoothness

Smoothness of coated surfaces of plates coated with aqueous paints was observed visually. Samples of which no shrink, pinhole, orange peel nor depression was observed were rated ◯, those on which slight occurrence of such defects was observed were rated Δ, and those on which a large number of such defects occurred were rated X.

(4) Hardness of Paint Film

Hardness of coated surfaces of plates coated with an aqueous paint was measured in a constant temperature room using TUKON microhardness tester produced by American Chain & Cable Company. Larger values indicate higher hardness.

(5) Curability

Luster reduction of aqueous paint film surface was observed visually after being rubbed with gauge wetted with xylol ten times, and curability was evaluated by 3 ratings:

◯: Normal, Δ: Luster reduction occurred.

(6) Anti-Chipping Properties

Tests were conducted using a stone-jetting tester (JA-400 type, produced by Suga Shikenki Co., Ltd.). Coated test plates were attached vertically in a sample holder in the tester, and 50 g of grade 7 crashed stone was jetted at an air pressure of 4 kg/cm$^2$ as measured by the pneumometer equipped with the tester to run the crashed stone against the test plate vertically. Degree of let-go or scraping by the collision of the stone was judged by 5 ratings ranging from good (◯) to poor (X).

(7) Adhesion

Adhesion was tested by cross-cut cellophane tape (1×1 mm, 100 pieces) peeling test, with mark "◯" indicating no peeling.

(8) Resistance to Humidity

In a blister box kept at a temperature of 50° c. and at a relative humidity of 98 to 100% RH, were left samples for 5 days when they were taken out and examined if swelling occurred. Mark "◯" indicates no swelling and "Δ" occurrence of swelling.

We claim:

1. A method for forming a multilayer paint film comprising the steps of forming an uncured film on a substrate with a cationically electrodepositable paint on a substrate, further coating an aqueous paint on the uncured film of the electrodeposited film in a wet-on-wet manner, and then curing with heating the both films, wherein (i) the electrodeposited film of the cationically electrodepositable paint has a film weight reduction after curing with heating of 10% by weight or less, the cationically electrodepositable paint comprising (A) a resin having hydroxyl groups and cationic groups, and (D) a blocked polyisocyanate compound being blocked with a blocking agent having a molecular weight of 130 or less as principal components;

wherein (ii) the aqueous paint is composed mainly of (a) a polyester resin optionally modified with a urethane and having an acid value within the range of 10 to 100 and a hydroxyl value within the range of 20 to 3000; and (b) a water-soluble or -dispersible amino resin having an imino group.

2. The method of claim 1, wherein said electrodeposited paint film has a weight has a weight reduction by curing with heating of 7% by weight or less.

3. The method of claim 1, wherein said resin (A) has primary hydroxyl groups and cationic groups.

4. The method of claim 1, wherein said resin (A) is a reaction product obtained by reacting a polyepoxide compound obtained from a polyphenol compound and epichlorohydrin with a cationizing agent.

5. The method of claim 4, wherein said polyepoxide compound is polyglycidylether of the polyphenol compound having a number average molecular weight of abut 800 to about 2,000 and an epoxy equivalent of 190 to 2,000.

6. The method of claim 1, said resin (A) has a hydroxyl equivalent within the range of 20 to 5,000.

7. The method of claim 4, said resin (A) has a primary hydroxyl equivalent within the range of 200 to 1,000.

8. The method of claim 1, wherein said resin (A) has an amine value within the range of 3 to 200 calculated as KOH (mg/g solids).

9. The method of claim 1, wherein said blocked polyisocyanate compound (D) is a polyisocyanate compound selected from the group consisting of isophorone diisocyanate and xylylene diisocyanate, said polyisocyanate compound being blocked with a blocking agent having a molecular weight of 130 or less.

10. The method of claim 9, wherein said blocking agent is an oxime type blocking agent.

11. The method of claim 1, wherein said blocked polyisocyanate compound (D) is selected from the group consisting of methyl ethyl ketoxime-diblocked isophorone diisocyanate, and methyl ethyl ketoxime-diblocked xylylene diisocyanate.

12. The method of claim 1, wherein the weight ratio of the solids content of said blocked polyisocyanate compound (D) to said resin (A) is within the range of 0.05 to 1.5.

13. The method of claim 1 wherein said cationically electrodepositable paint further contains at least one metal compound selected from the group consisting of a lead compound, a zirconium compound, a cobalt compound, an aluminum compound, a manganese compound, a copper compound, a zinc compound, an iron compound, a chromium compound and a nickel compound in an amount that the metal content based on the total weight of the resin (A) and the polyisocyanate compound (D) is not more than 10% by weight.

14. The method of claim 1, wherein said polyester resin (a) in said aqueous paint is a urethane-modified polyester resin.

15. The method of claim 14, wherein said urethane-modified polyester resin is a polyester resin modified with a polyisocyanate compound selected from the group consisting of tolylene diisocyanate, xylylene diisocyanate and isophorone diisocyanate.

16. The method of claim 1, wherein said polyester resin (a) has a weight average molecular weight within the range of 1,000 to 20,0000.

17. The method of claim 1, wherein said polyester resin (a) is a polyester resin rendered water-soluble or -dispersible by neutralization with a basic substance of at least 20% of an acid group existing in the polyester resin.

18. The method of claim 1, wherein said aqueous paint contains 50 to 90% by weight of said polyester resin and 50 to 10% by weight of said amino resin based on total weight of said polyester resin (a) and said amino resin (b).

19. The method of claim 1, wherein said curing with heating is carried out at a temperature of 70° to 250° C.

* * * * *